(No Model.) 5 Sheets—Sheet 2.

F. H. RICHARDS.
WEIGHING MACHINE.

No. 578,159. Patented Mar. 2, 1897.

Fig. 2.

Witnesses:
Chas. F. Schmelz
Fred. J. Dole.

Inventor:
F. H. Richards (No Model.)

F. H. RICHARDS.
WEIGHING MACHINE.

No. 578,159. Patented Mar. 2, 1897.

Witnesses:
Chas. D. Schmidt
Fred. J. Dole

Inventor
F. H. Richards (No Model.)

F. H. RICHARDS.
WEIGHING MACHINE.

Patented Mar. 2, 1897.

Witnesses:
Chas. E. Schmel
Fred. J. Dole

Inventor:
F. H. Richards (No Model.)

F. H. RICHARDS.
WEIGHING MACHINE.

Patented Mar. 2, 1897.

Witnesses:
Chas. L. Schmelz
Fred. J. Dole.

Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 578,159, dated March 2, 1897.

Application filed August 26, 1896. Serial No. 603,975. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object being to provide an improved machine of this character more especially intended for weighing flour, sugar, and other comparatively expensive materials where absolute accuracy in weight is an important desideratum.

In the drawings accompanying and forming part of this specification.

Similar characters designate like parts in all the figures of the drawings.

The framework for supporting the operative parts of the machine herein shown consists of the supporting bed or base 3, on which is mounted the chambered or hollow post 4, which supports the principal parts of the bucket-supply mechanism, as will hereinafter appear.

Figures 3, 12:
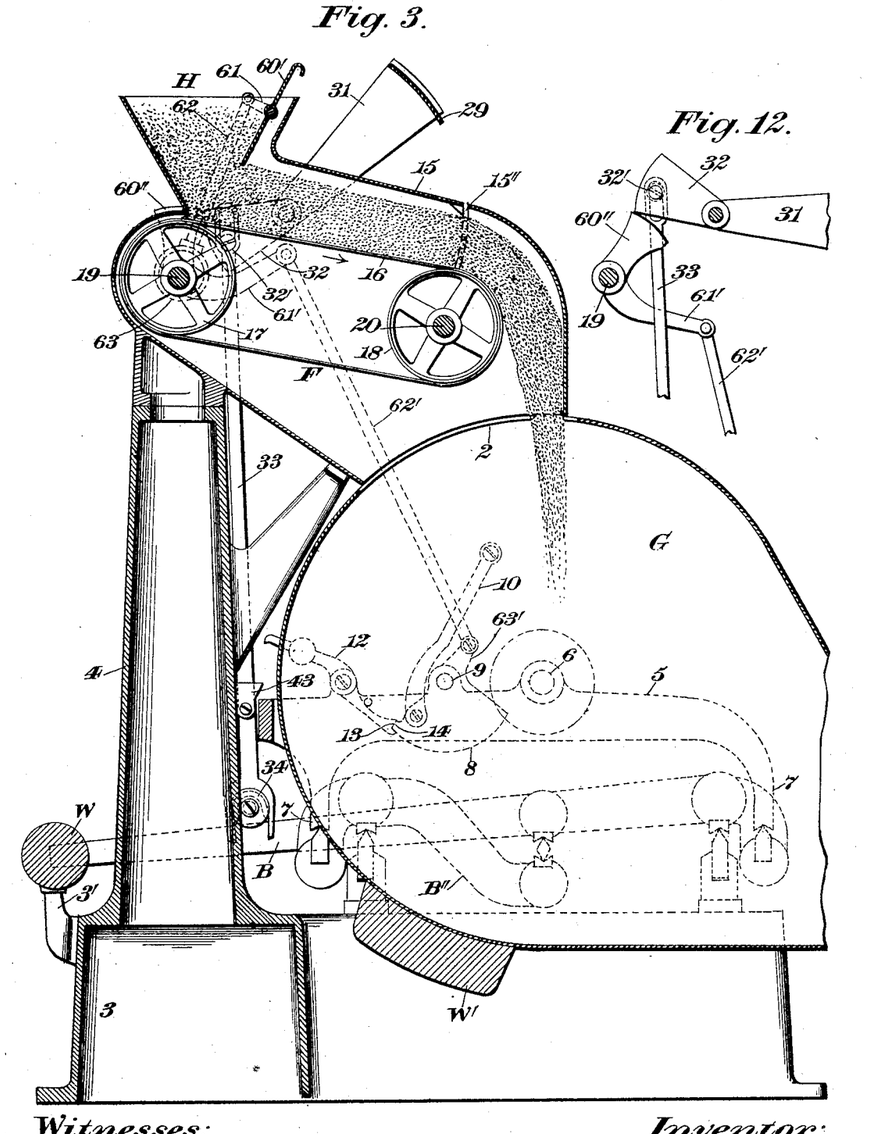
Fig. 3 is a central vertical section of the machine.
Fig. 12 is a detail view of interlocking stop devices.

The weighing mechanism includes a load-receiver, that herein illustrated being in the form of a bucket of the tilting or oscillatory type, as disclosed in Letters Patent No. 559,210, granted to me April 28, 1896, said bucket having the usual stream-inlet or supply-opening 2, Fig. 3.

For supporting and balancing the bucket, which is designated by G, I may employ the improved beam mechanism shown, which embodies a main beam B and a pair of supplemental or auxiliary beams, (designated by B' and B'', respectively.) The main beam B is in the form of a yoke or U-shaped frame having relatively long arms, the juncture between said arms or the transverse portion of said beam being furnished with a weight W.

By the use of the beam B herein illustrated I can obtain a relatively great amount of leverage, at the same time employing a weight of minimum size. The scale-beam B will be fulcrumed or pivotally mounted on the supporting-base 3, as is customary. The auxiliary beams B' and B'', which consist of two relatively short levers of compound curvature, will be also fulcrumed on the base of the machine and will respectively bear or exert their force against the main beam B at points intermediate the fulcrum of the latter and its weight, so that the leverage of the beam mechanism will be further multiplied.

The bucket G is supported for oscillation by the frame or yoke 5, it being provided with projecting trunnions 6, which work in suitable bearings formed in the opposite members of said frame. The bucket-frame 5 has a series of downwardly-projecting arms 7, which have formed at the lower extremities thereof suitable bearings or notches resting on pivots or knife-edges carried by the respective scale-beams.

The center of gravity of the loaded bucket will be situated forward of its axis of oscillation, so that when the bucket is released at the proper point in the operation of the machine it will be caused to tip instantly by the weight of the contents therein to effect a discharge thereof. When the descending movement of the beam mechanism or any one of the several scale-beams composing the same is herein alluded to, it is to be understood that the poising side or portion of such beam mechanism or beams is meant, unless otherwise specifically stated, the movement of such poising portions of the beams coinciding with that of the load-receiver or bucket G.

For maintaining the bucket or load-receiver against discharge movement during the loading period the following-described instrumentalities may be employed: A rocker is shown at 8, pivotally mounted on the bucket-frame, it being fixed to a relatively short rock-shaft 9, which is supported for movement on one of the members of the bucket-frame. The rocker 8 is operatively connected to the bucket G by the interposed link 10, which is pivoted, respectively, to such members and in such a manner that the three pivots of the rocker and link 10 will be virtually in alinement when the bucket is in its normal position, as indicated in Fig. 3, it being apparent that the rocker and link form a toggle, so that the rocker 8, and hence the bucket G, may be held against movement by a relatively small amount of pressure applied to the former.

A latch or detent is illustrated at 12 in the form of a counterweighted lever pivotally supported upon the frame 5 adjacent to the rocker 8 and having a shoulder 13, against which impinges a corresponding shoulder 14 on the rocker 8 when the bucket is in its normal position, so that said bucket will be held against discharge movement. The bucket-locking arm of the latch 12 swings obliquely upward to engage the rocker 8, and it will be evident that when the shoulder 14 of the former has been depressed and has crossed the plane of the curved face of the rocker 8 the latter and the bucket G will be free to swing about their respective axes. By virtue of the bucket-holding means, which involve a toggle, as previously pointed out, the shock caused by the bucket as it returns to its normal position is materially reduced, it being taken up or compensated for by such toggle, as will be obvious.

For returning the bucket to its normal position on the discharge of a load a weight W' of proper efficiency will be provided, it being suitably attached to a wall of the bucket at the rear of its center of movement.

For furnishing the material to the bucket to form the load therein I may employ any convenient means, but I prefer to utilize the improved mechanism herein shown, which comprises as one of its constituent parts a positive supply device in the form of a feeder, which conveys a stream of material from a suitable source of supply, such as the hopper or chute H, and delivers it to the bucket, so that by the use of such a feeder the machine is especially adapted for weighing certain classes of material which cannot be successfully weighed with the ordinary types of machines of this class.

The supply hopper or chute H in the form shown constitutes a part of the protecting hood or casing 15, the latter of which prevents scattering and consequent waste of the material during the process of weighing, said hood or casing being mounted on and suitably attached to the hollow post or standard 4, as indicated most clearly in Fig. 3, and entirely surrounding the feeder.

The feeder, which is designated by F, will preferably have a continuous movement during the load-supply period and of a uniform velocity, means independent of the feeder being employed for properly regulating the quantity or volume of the supply-stream which is delivered to the bucket. The feeder F in the form shown consists of an endless belt or apron 16, which is passed around the drums or pulleys 17 and 18, of ordinary construction, said pulleys or drums being keyed or otherwise firmly attached to their shafts 19 and 20, the extremities of the latter being journaled in the end walls of the casing 15.

For driving or operating the feeder F, the effective movement of which is indicated by the arrow, Fig. 3, the mechanism illustrated may be employed.

Figure 2:
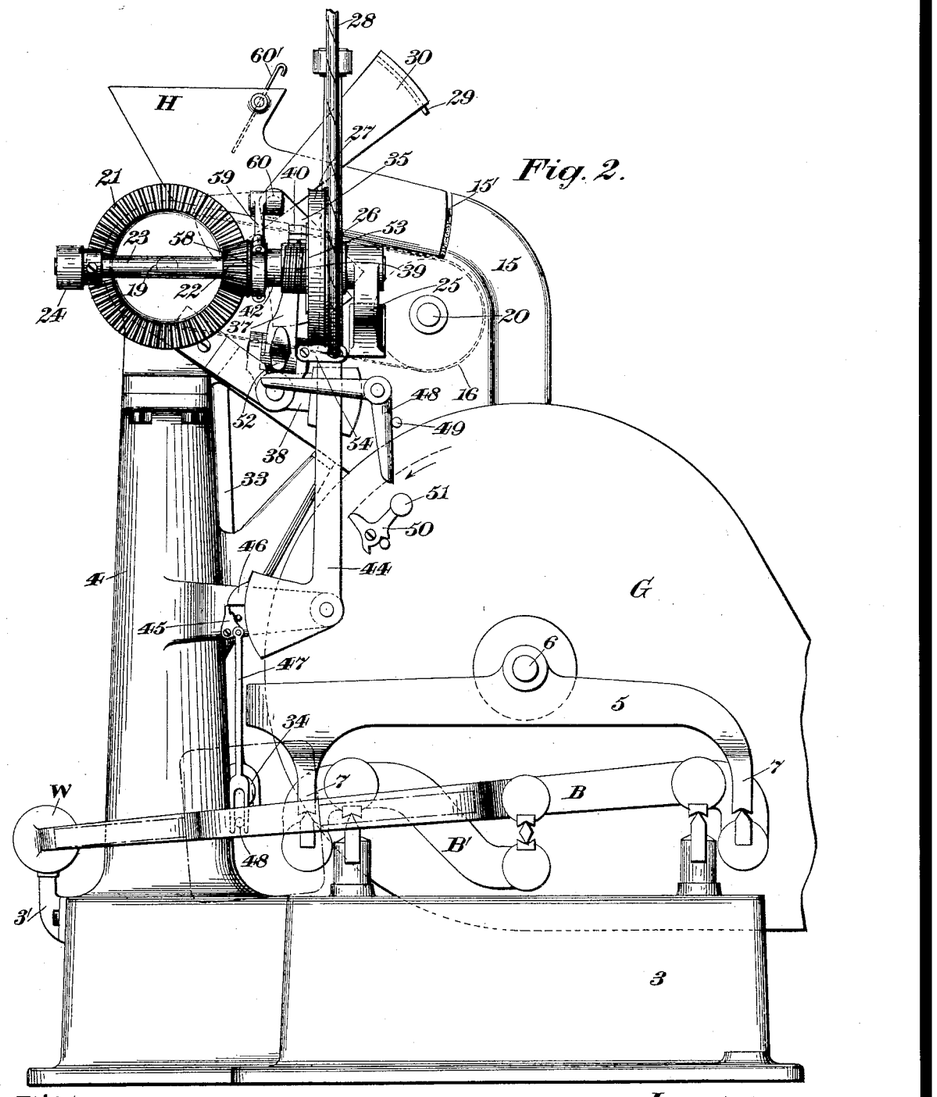
Fig. 2 is an end elevation as seen from the right in Fig. 1, the parts being in positions corresponding therewith.

A relatively large bevel-gear is shown at 21, it being rigidly secured to a main or power shaft 19 of the feeder and meshing with a smaller bevel-gear 22, which is fast on the shaft 23, as shown most clearly in Fig. 2, said shaft being rotatively supported by the arms or brackets 24 and 25, projecting from the wall of the casing or hood 15.

The shaft 23 is illustrated carrying a pair of pulleys, (designated, respectively, by 26 and 27,) the first mentioned being fast on said shaft and the other loose.

An endless driving belt or rope is illustrated at 28, it being also connected with the main or power wheel of a suitable motor. (Not shown.)

It will be evident that when the belt or rope 28 is on the fast pulley the result will be an effective movement of the feeder F through the interposed gearing and connections, so that said feeder is operable for conveying a stream of material from the chute or hopper H and for delivering it through the supply-opening 2 of the bucket, in which it lodges and is built up to form a load or charge. On the shipment of the belt 28 from the fast pulley 26 to the loose pulley 27 the result will be an immediate stoppage of the feeder or throwing the same out of action and consequently the cessation of supply to the bucket; and this throwing out of action of said feeder will preferably take place on the completion of the bucket-load, though the speed of the feeder, as hereinbefore stated, is of uniform velocity during the weighing of a bucket-load, whereby it is possible to expedite materially the output of the machine and insure great accuracy, which is an important essential.

For controlling or regulating the fed or forced stream, which is delivered to the bucket G by the feeder F, I prefer to employ a valve, which is mounted above and movable toward the upper run of such feeder during the weighing operation. The valve will have differential or variable speeds during its closure, its initial movement being a comparatively gradual or slow one, the final movement thereof being relatively accelerated, two successively effective actuators or actuating mechanisms being employed to impart such movements to the valve. During the major period of the weighing operation the valve will have a relatively slow closing movement toward the feeder, it being preferably operated by connections with the weighing mechanism, whereby a stream of large volume will be delivered to the bucket and the greater part of the load to be made up completed in a short space of time.

At the commencement of the poising period an accelerated or rapid-closing movement will be communicated to the valve, so that it will be caused to intersect the body or mass of material on the feeder, the valve continuing such movement until it almost reaches said feeder, the result being the supply to the bucket of a fine or drip stream, which passes between the lower edge of the valve and the upper run of the feeder, such drip-stream being to complete the partial load already in the bucket, it being understood that the speed or velocity of the feeder has not been diminished during the load-supply period.

For imparting the initial stream-reducing movement to the valve means operative with the weighing mechanism will be employed, but for effecting the final closure of such valve means extraneous of the weighing mechanism will be adopted, an actuator operative with the feeder-driving mechanism being shown for this purpose.

Figure 1:
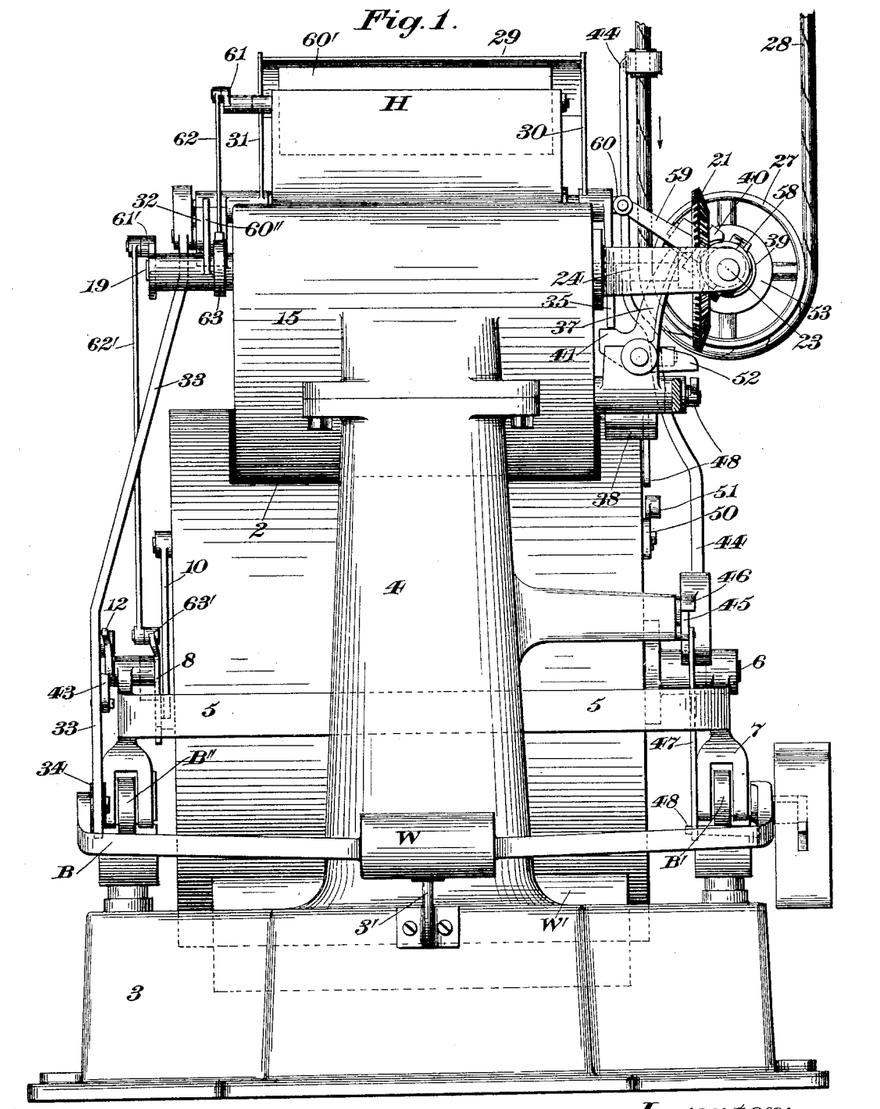
Figure 1 is a rear elevation of a weighing-machine comprehending my present improvements in one of the embodiments thereof, showing the positions occupied by the respective parts at the commencement of operation.

The stream-controlling valve is designated by 29 and consists of a slightly-curved plate joined to the opposite arms 30 and 31, the hubs of the latter being sleeved to projecting pivots on the hood or casing 15, as indicated in Fig. 1.

Figure 4:
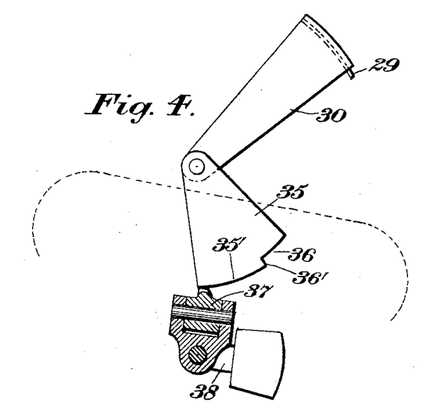
Figs. 4, 5, 6, 7, and 8 are detail views, in end and rear elevations, respectively, portions being in section, of part of the valve and valve-controlling mechanisms in several positions occupied thereby during the weighing of a load.

For imparting the relatively slow or gradual primary movement to the valve 29 connections with the scale-beam B are shown. The left-hand hub (see Fig. 1) of the valve is furnished with the rigid segmental block 32, to which is slidingly connected the depending bifurcated thrust-rod 33, the bifurcation or fork of which straddles or embraces a projection, such as the antifriction-roll 34 on the arm of the scale-beam B, said projection being situated on the counterpoised side of said beam or that part thereof to the left of its axis of movement. The bucket G being empty and the weight W resting on its support 3', the valve 29 will be wide open, as indicated in Figs. 2, 3, and 4, so that, the feeder F being in motion, a stream of large volume will be conveyed from the hopper H and delivered into the empty bucket. As the bucket commences to fill it and the beam mechanism will descend, such action causing the ascent of the counterpoise side of the scale-beam B, an upward thrust consequently being imparted to the rod 33, the segmental blade 32 being moved in a corresponding direction, and the valve 29 being gradually or slowly shut and to the position illustrated in Fig. 6, at which point the final or accelerated movement will be imparted to such valve to rapidly reduce the volume of the forced stream, the valve during such final action moving from the position last mentioned to that illustrated in Fig. 8 and between the walls of the two recesses 15' and 15" in the hood 15 and through the intervention of means operative with feeder-driving mechanism, as hereinbefore stated.

Figure 8:
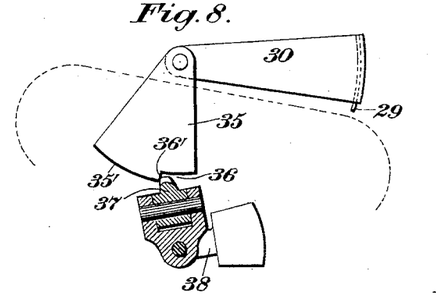

It will be evident that, the valve being in the position in which it is shown in Fig. 8, a stream of small volume may be delivered by the feeder F and into the bucket G, such stream having a relatively rapid speed, so that the load may be completed in a very short space of time.

The right-hand hub of the valve is furnished with the integral projecting segmental blade 35, which is positioned to receive a valve-closing force from a suitable actuator operative with the feeder-driving mechanism, such force being transmitted to the valve. The segmental blade 35 is notched or cut away, as at 36, for a purpose that will be hereinafter apparent.

A compound lever is herein illustrated consisting of two levers 37 and 38, the first-mentioned being jointed to or mounted on the latter and serving as a power-actuator for transmitting the final closing and multiplied movement to the valve 29, the lever 38 being counterweighted and being also pivotally supported by a projection on the hood or casing 15.

Figure 5:
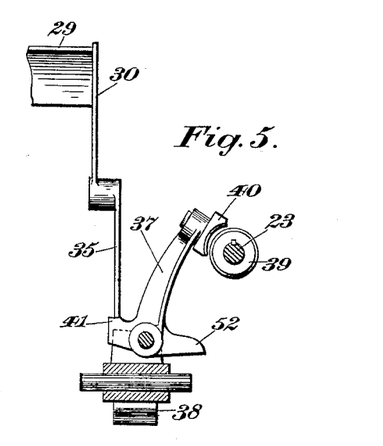
Figures 6, 7:
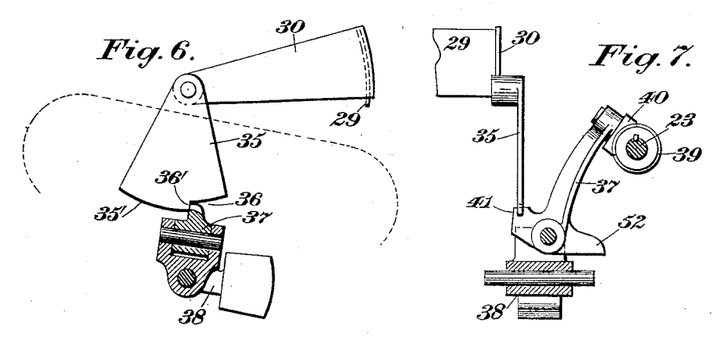

The shaft 23 carries a short worm 39, which may be keyed thereto, as indicated in Figs. 5 and 7, and with which is adapted to mesh a screw operative with the actuating-lever 37, such meshing screw being formed on the oscillating block 40, which is supported at the upper end of the lever 37, and by reason of the peculiar mounting of the block 40 when its thread meshes with the thread of the worm 39 the lever 37 may be operated and the block will properly conform to changes in its angle of presentation to the worm 39. The lever 37 is furnished with a projecting toe 41, which normally impinges against the curved face 35', as indicated in Figs. 4 and 5, so that the thread on the block 40 will be held out of engagement with or beyond the plane of movement of the rotating worm 39. The lever 37 will have a preponderation of weight above its axis of movement, as just stated, and will be held in its inoperative position by the blade 35, which acts as an effective stop for this purpose. When, however, the notch 36 reaches a point opposite the projection or toe 41 of said lever, due to the closure of the valve, such toe or projection will be thrust into the recess 36, and simultaneously with this action the screw or thread on the block 40 will be caused to mesh with the worm 39, so that, these parts being in mesh and the worm 39 rotating with the shaft 23, the lever 37 will be instantly swung to what is the left in Fig. 2, and, the projection or toe 41 bearing against the shoulder 36' of the blade 35, such blade will be moved in a corresponding direction and the valve will be given its final closing or multiplied movement, as will be obvious.

When the valve 29 has reached the end of its cut-off stroke, as indicated in Fig. 8, the threaded block 40, its thread at this time having passed out of engagement with the worm 39, may drop into the groove 42 on the shaft 23, whereby the further movement of the lever 37, and consequently the valve, will be intercepted. The valve 29 having reached the end of its working stroke or cut-off movement, as indicated in Fig. 8, it will be evident that a drip-stream of material may pass between the lower edge of said valve and the upper run of the feeder and into the bucket, so that such drip will complete the partial load which has already been delivered thereinto by the main stream, which latter is of large volume, as has been pointed out.

It will be remembered that a latch 12 has been described as constituting a part of the bucket-holding means, such latch being normally in engagement with the rocker 8. For tripping the latch I prefer to employ means operative with the beam mechanism. As the counterpoised side of the scale-beam ascends during the main-supply period the valve 29 will be closed through the medium of the thrust-rod 33, which is in operative relation with such members, the lower wall of a slot formed adjacent to the upper end of said rod bearing against a pin 32' on the block 32, (see Fig. 3,) such action continuing until the valve 29 is given its final closing movement through the intervention of the power-actuating device, at which time the pin on the block 32 will have an independent movement away from the lower wall of the slot in the rod 33, so that the latter at a subsequent point in the operation of the machine may be thrust farther upward, though the valve 29 has reached the end of its effective movement, and the final upward thrust of the rod will be preferably utilized for tripping the latch 12.

The free arm of the latch 12 is disposed in the path of movement of the latch-tripper 43, which is in the form of a pivotally-mounted dog on the thrust-rod 33, so that at a point near the close of the poising period and on the upward movement of the rod 33 such dog will trip the latch 12 and disengage its locking-arm from the rocker 8, so that the latter and the bucket G are free to oscillate, such action of the bucket being caused by the preponderance of weight of the material or load therein forward of its axis of movement.

For throwing the feeder F out of action on the completion of a bucket-load I have illustrated a belt-shipper which is self-active or self-operative, it being in the form of a right-angled counterweighted lever held against movement during the loading period, but which, when released, is instantly effective for shipping the belt 28 from the fast pulley 26 to the loose pulley 27. Such belt-shipper is designated by 44, it being pivotally mounted on a bracket extending from the post or standard 4, the upright arm of said lever being furnished with the usual belt-engaging loop, through which the belt is adapted to travel.

For normally holding the belt-shipping lever 44 against movement a stepped catch is illustrated at 45, pivoted adjacent to the weighted arm of said lever and upholding the same by engaging the projecting lug 46 on said counterweighed arm.

A tripping-rod is shown at 47, depending from the catch 45, said tripping-rod being bifurcated at its lower end and straddling a projecting pin 48 on the counterpoised side of an arm of the scale-beam B, as indicated in Fig. 2, so that as said arm ascends, and at a point very near the close of the poising period, a blow will be imparted to the tripping-rod 47, and the catch 45 will be swung out and disengaged from the lug 46 on the counterweighted arm on the belt-shipping lever 44, so that said counterweighted arm will immediately drop, and the upright arm thereof concurrently swinging to the left the belt 28 will be shipped from the fast pulley 26 to the loose pulley 27, whereby the movement of the feeder F is instantly stopped.

For opening the valve 29 the segmental blade 32, to which reference has been heretofore made, will be preferably employed, said blade being adapted, when the valve is released by the lever 37 and as the counterpoised side of the beam B returns to its normal position, to drop, and being rigid with the valve will open the same.

Means will be employed for resetting the lever 37 and for returning it to its normal position.

An angle-lever is shown at 48, it being supported by the casing 15, and the vertical arm of which rests against a stud 49 on said casing, as indicated in Fig. 2, said vertical arm being disposed in the path of movement of a resetting device, which is illustrated at 50, the latter being mounted on the bucket G for oscillation and being in the nature of a bypass. As the bucket tilts to discharge its contents the operating-arm of said by-pass will be met by the vertical arm of the lever 48, and hence swung ineffectively about its axis, so that the bucket may freely tilt, and when said by-pass moves away from the angle-arm it will immediately resume its normal position by virtue of the counterweight 51. When the bucket has nearly reached its normal position, the resetting device 50, following the line of movement indicated by the dotted lines and arrow in Fig. 2, which is then positively held against movement, will impinge against the upright or vertical arm of the angle-arm 48 and will force the horizontal arm of the angle-lever upward until it comes against the lug 52 on the actuating-lever 37, said lug being moved in a corresponding direction and the toe 41 being projected downward and below the plane of the curved face 35' of the blade 35, so that the valve 29 is released and may be opened by the weighted block 32, as previously described.

When the toe or projection 41 is removed from the notch 36, the former will instantly bear against the curved face 35', the valve 29 having been opened, as indicated in Fig. 4, and the threaded block 40, which is mounted on the lever 37, will be held beyond the plane of rotation of the worm 39, Fig. 5. On such movement of the lever 37 the counterweighted arm of the lever 38, moving to the right, will carry the lever 37 in a coinciding direction until the threaded block meets the plane face of the disk 53, which forms a part of the loose pulley 27 and is concentrically secured thereto, such disk serving as a means for straightening the block 40, so that it may be properly presented to the worm 39 on the succeeding operation of the machine.

For operating the belt-shipper 44, whereby the belt 28 may be shipped from the loose pulley 27 to the fast pulley 26 to thereby start the feeder, a link is illustrated operatively connecting the lever 37 and such belt-shipper, the connection between the parts being a sliding one, so that the lever may have a valve-operating movement without affecting the position of the belt-shipper while the load is being weighed out. Such a link is shown at 54, pivoted to the lever 37 and longitudinally slotted near its opposite end, the walls of the slot embracing a pin or stud located approximately midway of the belt-shipper.

Figure 9:
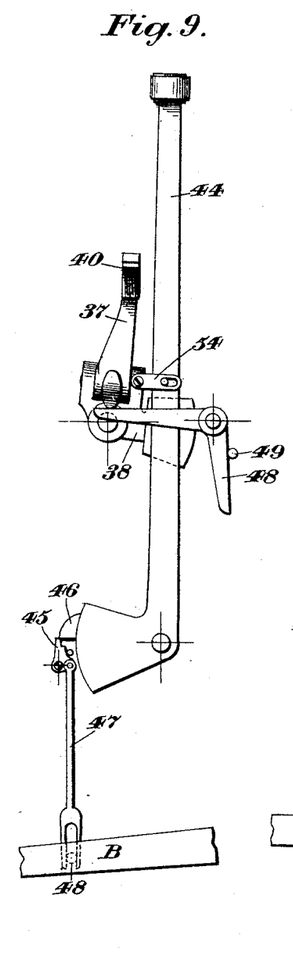
Figs. 9, 10, and 11 are detail views, in end elevation, of feeder and valve-controlling mechanisms in three successive positions.
Figure 10:
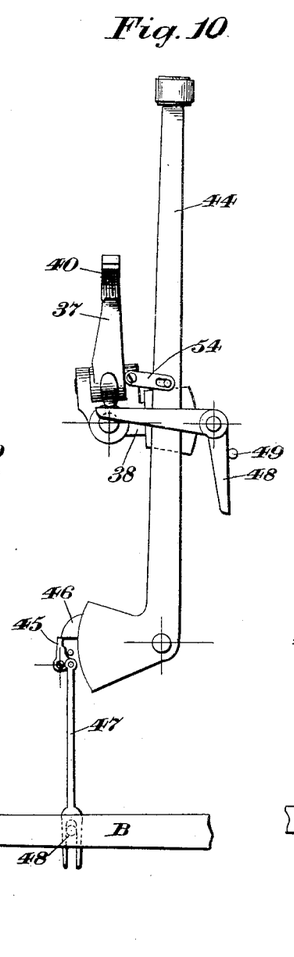

At the commencement of operation, as indicated in Fig. 9, the left-hand end of the short wall of the longitudinal slot will be against the pin on the belt-shipping lever, so that the valve-actuating lever may move a distance equal to the length of said longitudinal slot without affecting the belt-shipping lever 44.

Figure 11:
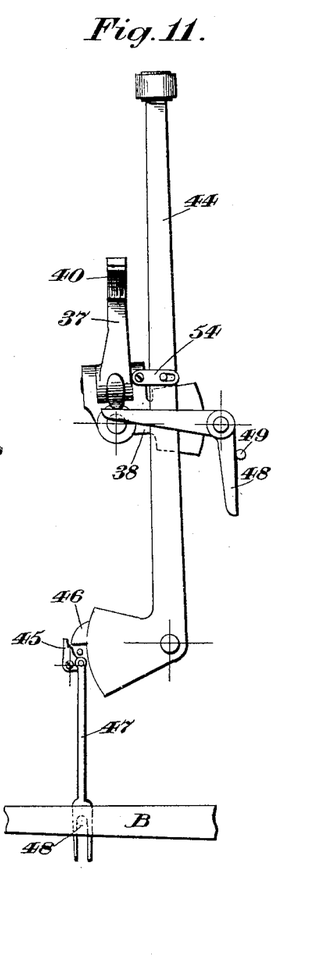

When the weighted arm of the lever 44 drops in the manner previously described, the pin will be caused to move against the left-hand short wall of the longitudinal slot, as indicated in Fig. 11, so that on the return movement of the counterweighted lever 38 the belt-shipper 44 will be swung to the right, and the belt consequently moved from the loose pulley 27 to the fast pulley 26, to thereby start the feeder F.

I have shown herein means for vibrating the valve 29 and in a direction transversely of the line of feed of the supply-stream, so that by constantly keeping the valve in motion during the supply period, and more especially while the drip-stream is being conducted to the bucket, particles of the material are prevented from adhering or sticking to the valve. The shaft 23 is provided with an eccentric which is embraced by the strap or split ring 58, to which latter a pitman or rod 59 is attached, the opposite end of said pitman or rod 59 being pivoted to the lug or ear 60 on the right-hand hub of the valve 29, so that on the rotation of the shaft 23 a vibratory movement will be communicated to the valve 29 for accomplishing the hereinbefore-described results.

I have illustrated, located within the chute or hopper H, a disintegrating device in the form of a relatively flat blade, which is also vibratory during the weighing period, so that the mass within the chute or hopper may be stirred up or disintegrated and the formation of lumps therein necessarily prevented. The blade 60' has projecting trunnions, which are journaled in the end walls of the chute or hopper, one of said trunnions being extended beyond a wall of said chute and rigidly carrying the crank-arm 61, to which is pivoted the connecting-rod 62, the opposite end of the latter being furnished with a strap or ring 63, embracing an eccentric on the main shaft of the feeder, as indicated in Fig. 1, so that on the rotation of said shaft by the feeder-driving mechanism the device or blade 60' will be vibrated or jarred, as will be apparent.

It will be understood that when the belt 28 is shipped from the fast pulley 26 to the loose pulley 27 on the completion of a bucket-load the movement of the feeder, and hence the vibratory movement of the valve 29 and the blade 60', will be concurrently stopped.

I have illustrated herein reciprocally effective stops operative, respectively, with the bucket and with the valve 29, such stops being operative for preventing the oscillation of the bucket during the loading period should the latch 12 be prematurely tripped, and for also holding the valve firmly closed while the bucket is discharging its contents. The segmental blade 32, to which reference has been hereinbefore made, constitutes one of the pair of stops, its mate or companion being designated by 60'' and being also segmental in shape, the hub of the latter being sleeved to the transverse shaft 19 and having a projecting arm 61', which is pivotally connected by the interposed rod 62' to the arm 63' on the rocker 8. During the bucket-loading period the stop member 60'' will be approximately contiguous to the block or stop 32, as indicated in Fig. 3, so that should the latch 12 not be in its bucket-holding position the bucket will be positively held against tilting or discharge movement by the stop 32, against which the coacting member 60'' impinges.

When the lower straight face of the block 32 has intersected the plane of curvature of the curved face of the member 60'', due to the closure of the valve 29 to the position indicated in Fig. 8, the bucket-holding influence of the member 60'' will be removed, so that the bucket may tilt, and in so doing the member 60'' will be forced under the block 32 to thereby hold the valve against retractive movement and until the bucket G has reached its stream-receiving position. (See Fig. 12.)

The operation of a weighing-machine comprehending the hereinbefore-described improvements is as follows: Fig. 2 represents the positions occupied by the respective working parts at the commencement of operation, the bucket G being locked in its stream-receiving position by the latch 12, which is in engagement with the rocker 8, Fig. 3, the valve 29 being wide open. The belt 28 being on the fast pulley 26, the feeder F will be driven through the interposed gearing and connections with said fast pulley 26, so that it is operable for conveying a body or stream of material from the chute or hopper H and delivering it to the empty bucket. When a certain proportion of the load has been received by the bucket, it will descend, the counterpoised side of the beam B ascending, and the lower wall of the longitudinal slot formed near the upper end of the thrust-rod 33 being against the projecting pin or stud on the block 32 the valve 29 will be closed from the position illustrated in Figs. 2, 3, and 4 to that shown in Fig. 6 by the counterpoised side of said scale-beam as it rises. When the valve 29 reaches the position indicated in Fig. 6, the blade 35, moving in coincidence with said valve, the notched or cut-away portion 36 of said blade will be opposite the projection or toe on the valve-actuating lever 37, so that the thread on the oscillating block 40 may be caused to mesh with the worm 39 by the lever 37 dropping. (See Fig. 7.) These parts meshing, the lever 37 will be quickly swung to the left, and the projection or toe 41 being against the shoulder 36' on the blade 35 the valve 29 will be rapidly closed and moved nearly to the upper run of the feeder F, as illustrated in Fig. 8, so that such feeder may deliver to the bucket a relatively fine stream, which constitutes the drip. On the completion of the load by the drip-stream the bucket will descend below the poising-line, and the rod 33 being thrust upward as the counterpoised side of the beam B ascends and until the dog 43 meets the free arm of the latch 12, so that on the continuation of such movement of the dog the latch 12 will be tripped and the rocker 8 released, so that the bucket is free to oscillate. At about the time such last-described action takes place the catch 45 will be tripped, as illustrated in Fig. 11, and the counterweighted arm of the belt-shipping lever 44 will be released, so that it may drop, and the upright arm of said lever moved to the left. The belt 28 will thereby be shipped from the fast pulley 26 to the loose pulley 27, so that the movement of the feeder F will be stopped.

The latch 12 having been tripped, the bucket G will be free to oscillate to discharge its contents, which operation is effected by the weight of the mass in the bucket lying forward of the axis of oscillation thereof, which causes the bucket to tilt in the well-known manner. On the discharge of the contents from the bucket it will resume its normal position, and the remaining parts of the mechanism dependent on their operation therefrom will be returned to their primary positions.

Having described my invention, I claim—

1. The combination with weighing mechanism including a bucket, of a feeder operable for delivering a stream of material to said bucket; driving mechanism for said feeder; a valve located above and movable toward the feeder during the weighing of a load; and valve-actuating means.

2. The combination with weighing mechanism including a bucket, of a feeder operable for delivering a stream of material to said bucket; driving mechanism for said feeder; a valve located above said feeder; and means for moving said valve toward the feeder at differential speeds.

3. The combination with a feeder, of driving mechanism for said feeder; a valve; and successively-effective actuators for moving said valve toward the feeder at differential speeds.

4. The combination with a feeder and its driving mechanism, of a valve; mechanism for imparting a primary movement to said valve; and independent means operative with the feeder-driving mechanism, for imparting a final movement to said valve.

5. The combination, with a bucket, and with stream-supply means therefor; of a stream-controlling valve; and a plurality of successively operative and independently-mounted actuators for effecting the closure of said valve at differential speeds.

6. The combination with weighing mechanism embodying a bucket, of a feeder consisting of a belt supported by a pair of rolls; means for rotating one of said rolls; and a valve located above the feeder-belt and movable toward the upper run thereof during the weighing of a load; and valve-actuating mechanism.

7. The combination with weighing mechanism embodying a bucket, of a feeder operable for delivering a stream of material to said bucket; driving mechanism for said feeder; a stream-controlling valve; mechanism for actuating said valve to cause it to intersect the body of material supported on the feeder; means for intercepting said valve when it has nearly reached the feeder, whereby said feeder will deliver a relatively fine stream to the bucket; and valve-actuating means.

8. The combination with weighing mechanism embodying a bucket, of a feeder operable for delivering a stream of material to said bucket; mechanism for driving said feeder at a uniform velocity during the weighing of a load; a valve located above and movable toward said feeder during the weighing of a load; and means for effecting the closure of said valve at differential speeds.

9. The combination with a bucket, of supply means therefor; a valve; beam mechanism for supporting said bucket and for also positively imparting a primary closing movement to said valve; and instrumentalities for effecting a further and accelerated movement to said valve.

10. The combination with a bucket, of a feeder operable for delivering a stream of material to said bucket; driving mechanism for said feeder; a valve; beam mechanism for supporting the bucket and for also imparting a primary closing movement to said valve; and means operative with the feeder-driving mechanism, for imparting a further closing movement to said valve.

11. The combination, with weighing mechanism, and with stream-supply means therefor; of a reciprocatory stream-controller; and successively-effective and independently-mounted mechanisms for imparting differential speeds, respectively, to said stream-controller on one of its strokes.

12. The combination, with weighing mechanism, of a feeder, and its driving mechanism; a stream-controller; an actuating member for the latter, located to receive its stream-controller-actuating force from the feeder-driving mechanism; and means for throwing said actuating member into operative connection with the feeder-driving mechanism at a predetermined point.

13. The combination with stream-supply means and a stream-controlling valve, of a shaft having a worm; and an operating-lever for the valve, carrying a threaded block adapted to be thrown into mesh with the worm to thereby actuate the valve.

14. The combination with stream-supply means and with a stream-controlling valve, of a shaft having a worm; and an operating-lever for said valve, carrying a threaded oscillating block adapted to be thrown into mesh with the worm to thereby actuate the valve.

15. The combination with stream-supply means and with a stream-controlling valve, of a shaft having a worm; a segmental notched blade connected to said valve; an operating-lever for said valve, said lever having a threaded block and also having a projection normally bearing against the curved face of the blade; and means for partially closing said valve, whereby the blade will concurrently be moved and the notch therein caused to come opposite the projection on said lever into which said projection may be thrust, whereby the thread of the block will be caused to mesh with the worm to thereby further actuate the valve.

16. The combination with a feeder having a shaft provided with a gear, of a second shaft also having a gear meshing with said first-mentioned gear; a worm on said second shaft; a stream-controlling valve; and an operating-lever for the valve, carrying a threaded block adapted to be thrown into mesh with the worm to thereby actuate the valve.

17. The combination with beam mechanism and with a bucket supported thereby, of stream-supply means for said bucket; a stream-controlling valve having a rod operatively connected thereto and operable by the beam mechanism; a shaft having a worm; and an operating-lever for said valve, carrying a threaded block adapted to be thrown into mesh with the worm.

18. The combination with beam mechanism and with a bucket supported thereby, of stream-supply means; a stream-controlling valve having a stop operative therewith; a rod attached to said stop and operable by the beam mechanism; a shaft having a worm; an operating-lever for the valve having a threaded block adapted to be thrown into mesh with the worm; and a stop operative with the bucket and coacting with said first-mentioned stop.

19. The combination with beam mechanism and with a bucket normally held against discharge movement by means comprehending a latch, of stream-supply means; a stream-controlling valve having a rod attached thereto, said rod being operated by the beam mechanism; a shaft having a worm; an operating-lever for the valve, having a block adapted to be thrown into mesh with the worm; and a tripper for the latch, mounted on said rod.

20. The combination with stream-supply means, of a shaft having a worm; an operating-lever for the valve, carrying a threaded block adapted to be thrown into mesh with the worm to thereby actuate the valve; and resetting means for said lever.

21. The combination with weighing mechanism embodying a bucket, of stream-supply means for said bucket; an operating-lever for the valve, carrying a threaded block adapted to be thrown into mesh with the worm to thereby actuate the valve; and means operated by the bucket for resetting said lever.

22. The combination with weighing mechanism embodying a bucket, of a feeder and its driving mechanism including fast and loose pulleys; a belt shiftable from one of said pulleys to the other; a self-operative belt-shipper; means for normally holding said belt-shipper against movement; and releasing and resetting instrumentalities for said belt-shipper, coöperative with and controlled by the weighing mechanism.

23. The combination with weighing mechanism embodying a bucket, of a feeder and its driving mechanism including fast and loose pulleys; a belt shiftable from one of said pulleys to the other; a belt-shipper; a catch normally holding said belt-shipper against movement; and tripping means for said catch, coöperative with and controlled by the weighing mechanism.

24. The combination with weighing mechanism embodying a bucket, of a feeder and its driving mechanism including fast and loose pulleys; a belt shiftable from one of said pulleys to the other; a belt-shipper; a catch normally holding said belt-shipper against movement; and means operative with the weighing mechanism for tripping said catch.

25. The combination with a bucket and a scale-beam for supporting the same, of a feeder and its driving mechanism including fast and loose pulleys; a belt shiftable from one of said pulleys to the other; a belt-shipper; a catch normally operative for holding said belt-shipper against movement; and a rod for tripping said catch, said rod being operated by the scale-beam.

26. The combination with a bucket and a scale-beam for supporting the same, of a feeder and its driving mechanism including fast and loose pulleys; a belt shiftable from one of said pulleys to the other; a belt-shipper consisting of a counterweighted anglelever, one of the arms of which has a lug; a catch for engaging said lug to thereby hold the belt-shipper against movement; and a depending rod connected to said catch and having a bifurcation which straddles a pin on the scale-beam.

27. The combination with weighing mechanism embodying a bucket, of a feeder; a shaft connected to said feeder by gearing for driving the same; a worm and fast and loose pulleys on said shaft; a stream-controlling valve; an operating-lever for said valve, having a block provided with a thread adapted to be thrown into mesh with the worm; a belt shiftable from one of said pulleys to the other; and a belt-shipper.

28. The combination with weighing mechanism embodying a bucket, of a feeder; a shaft connected by gearing to said feeder, said shaft carrying a worm and fast and loose pulleys; a belt shiftable from one of said pulleys to the other; a valve; two pivotally-connected levers, one of which is counterweighted and the other of which has a threaded block adapted to be thrown into mesh with the worm; and a belt-shipper.

29. The combination with weighing mechanism embodying a bucket, of a feeder; a shaft connected by gearing to said feeder, said shaft carrying a worm and fast and loose pulleys; a belt shiftable from one of said pulleys to the other; a valve; two pivotally-connected levers, one of which is counterweighted and the other of which has a threaded block adapted to be thrown into mesh with the worm; a resetting-lever adapted to impinge against a projection on the operating-lever; and means for actuating said resetting-lever.

30. The combination with weighing mechanism embodying a bucket, of a feeder; a shaft connected by gearing to said feeder, said shaft carrying a worm and fast and loose pulleys; a belt shiftable from one of said pulleys to the other; a valve; two pivotally-connected levers, one of which is counterweighted and the other of which constitutes a valve-operating lever and has a threaded block adapted to be thrown into mesh with the worm; a resetting-lever adapted to impinge against a projection on the operating-lever; means for actuating said resetting-lever; and a device carried by the bucket for actuating said resetting-lever.

31. The combination with weighing mechanism embodying a bucket, of a feeder; a shaft connected by gearing to said feeder, said shaft carrying a worm and fast and loose pulleys; a belt shiftable from one of said pulleys to the other; a valve; two pivotally-mounted levers, one of which is counterweighted and the other of which constitutes an operating-lever for said valve, it being provided with a threaded block adapted to be thrown into mesh with the worm; a belt-shipper; a resetting-lever adapted to impinge against a projection on the operating-lever; a device carried by the bucket and located to impart a blow to said resetting-lever; and a connection between the counterweighted lever and the belt-shipper.

32. The combination with weighing mechanism embodying a bucket, of a feeder and its driving mechanism including a shaft having fast and loose pulleys; a valve; and an operating-lever for said valve, having an oscillating threaded block adapted to be thrown into mesh with a worm on said shaft and also against a disk on one of said pulleys.

33. The combination with stream-supply means and with a valve, of a power-shaft having a gear thereon; a power-transmitting device operative with said valve; and means for throwing said power-transmitting device into operative relation with said gear.

34. The combination with a feeder and its driving mechanism including a shaft provided with an eccentric, of a valve; mechanism for actuating said valve; and a rod connected to said valve and provided with a strap embracing the eccentric on said shaft.

35. The combination with beam mechanism and with a bucket supported thereby, said bucket being oscillatory for discharging the load; of a rocker supported independently of the bucket and operatively connected thereto; detent means for said rocker; stream-supply means for the bucket; a valve; and a pair of coacting stops coöperative, respectively, with said valve and rocker.

36. The combination with beam mechanism, of a frame supported thereby and carrying an oscillatory bucket; a rocker mounted on the frame and connected to the bucket by a link; detent means for said rocker; stream-supply means for the bucket; a valve having a stop; a second stop coacting therewith; and a rod operatively connecting said second stop with said rocker.

37. The combination with beam mechanism embodying a main scale-beam consisting of two relatively long counterweighted arms and a pair of auxiliary scale-beams consisting of two shorter arms which bear against the long arms of the main scale-beam, said respective beams being suitably fulcrumed; of a frame supported by the beam mechanism; a bucket journaled in said frame for oscillatory movement; means normally operative for maintaining the bucket against such movement; means for supplying said bucket with a stream of material; and stream-controlling mechanism.

FRANCIS H. RICHARDS.

Witnesses:
FRED. J. DOLE,
HEATH SUTHERLAND.